United States Patent

Pless

[15] 3,671,437

[45] June 20, 1972

[54] ETCHANT FOR SELECTIVELY ETCHING PATTERNS IN THIN SILICON DIOXIDE LAYERS AND METHOD OF PREPARING SUCH AN ETCHANT

[72] Inventor: Uwe Pless, Hamburg, Germany

[73] Assignee: U.S. Philips Corporation, New York, N.Y.

[22] Filed: Oct. 16, 1970

[21] Appl. No.: 81,523

[30] Foreign Application Priority Data

Oct. 15, 1969 Germany ......................P 19 51 968.7

[52] U.S. Cl. ....................................252/79.3, 156/8, 156/17

[51] Int. Cl. ..........................................................C23d 1/00

[58] Field of Search ................252/79.3; 156/17, 8; 204/141, 204/143

[56] References Cited

UNITED STATES PATENTS 3,474,021 10/1969 Daridse et al. ..........................204/192

FOREIGN PATENTS OR APPLICATIONS 1,002,026 10/1951 France

OTHER PUBLICATIONS

Jache et al. " Solubility of Fluorides in Liquid Hydrogen Fluoride" Jour. Phys. Chem. (56) 1106–09 (1952)

*Primary Examiner*—Robert F. Burnett
*Assistant Examiner*—R. J. Roche
*Attorney*—Frank R. Trifari

[57] ABSTRACT

This disclosure is directed to an aqueous etching composition for silicon dioxide based on ammonium fluoride and hydrofluoric acid to which an arsenic or thallium salt has been added and to a method of etching layers of silicon dioxide by means of said etching composition.

2 Claims, No Drawings

ETCHANT FOR SELECTIVELY ETCHING PATTERNS IN THIN SILICON DIOXIDE LAYERS AND METHOD OF PREPARING SUCH AN ETCHANT

The invention relates to an etchant based on ammonium fluoride and hydrofluoric acid for selectively etching patterns in thin silicon dioxide layers and to a method of preparing such an etchant. Patterns of any desired shape and structure may be etched from thin layers by partially covering said layers with the aid of a layer resistant to the action of the etchant and corresponding to the desired pattern and by etching the free parts of the layer with the aid of an etchant. The protective layer may be obtained, for example, with the aid of a photoresist.

When etching a certain layer there is the risk that the substrate and other layers also present on the substrate are attacked by the etchant. Whereas adjacent parts of the layer can be protected by means of a photoresist coating, this is not possible for underlying layers and the substrate itself. Thus, for example, in the manufacture of magnetic thin-layer storage elements it is necessary to selectively etch silicon dioxide layers having a thickness of from 1 to 2 micrometers relative to thin layers of iron, silicon-iron alloys containing up to 10.5 percent by weight of silicon, nickel, cobalt-nickel alloys containing up to 50 percent by weight of nickel, and aluminum. The etchants which are commonly used for silicon dioxide in micro-electronics severely attack inter alia, iron-silicon alloys and aluminium. Of these known etchants the buffered etchant of the composition mentioned below is most suitable in connection with its etching properties and its agressiveness as compared with the conventional photoresists:

40 g $NH_4F$
10 mls HF 40%
60 mls $H_2O$
100 mls buffered etchant.

Although, for example, the attack of aluminium by this etchant ends after several thousand A because a thin passivated layer which is insoluble in the etchant is produced, this etchant cannot be used for actually selective etching of patterns.

It is known that the dissolution rate of iron in sulphuric acid is inhibited by addition of arsenous oxide. According to Gmelins Handbuch der Anorganischen Chemie, Vol.50 (Iron) part A, 8th edition; page 59, some ascribe this phenomenon to the formation of a coating of metallic arsenic, while others ascribe it to the formation of a high hydrogen over-voltage on iron. Since arsenic is attacked by aqueous solutions of hydrofluoric acid (see Gmelins Handbuch der Anorganischen Chemie, Vol. 17 (Arsenic), 8th edition, page 178) the last-mentioned assumption might be correct.

The object of the present invention is to provide an etchant which for use in selective etching does not attack the non-selected materials, particularly magnetic materials, for more than several hundred A throughout the etching period without reducing the properties of the etchant relative to silicon dioxide.

According to the invention this condition is satisfied by an etchant based on ammonium fluoride and hydrofluoric acid, which is characterized in that a quantity of arsenous oxide, thallium (1) fluoride or a mixture of both substances is present in the etchant.

Thus the invention is based on the recognition of the fact that substances are added to the known buffered etchant which substances modify the properties of the etchant only with reference to the selectivity relative to magnetic materials and aluminium. Due to the addition of arsenous oxide the attack of magnetic materials is reduced while the addition of thallium (1) fluoride reduces the attack of aluminium.

To maintain the rate of attack of magnetic materials and/or of aluminium at less than 300 A per 20 min. the quantity of the additions to the etchant according to a preferred embodiment is 5 to 40 mgs of arsenous oxide and/or 400 to 1,000 mgs of thallium (1) fluoride per 100 mls of a buffered etchant which contains 40 gms of ammonium fluoride, 10 mls of hydrofluoric acid 40 percent and 60 mls of water.

EXAMPLE

The selectivity of an etchant of the composition:

40 g $NH_4F$
10 mls HF 40 %
60 mls $H_2O$ as well as of buffered etchants of the said compositions which in addition contain $As_2O_3$ and $As_2O_3$ and TlF, respectively, was found by experiments. The following experimental layers were used:

1. 0.8 $\mu$ thick $SiO_2$ layers grown on an Si-wafer during heating
2. 400 A to 800 A thick sputtered layers of Fe; FeSi including 10.5 percent by weight of Si; Ni; CoNi including 50 percent by weight of Ni; and Al;
3. 1 to 1.5 $\mu$ thick layers of the previously mentioned materials.

The etching rates were mainly found for layers of the types 1 and 2 while using etchants of different compositions. The quantities of $As_2O_3$ and thallium fluoride were chosen between one-fourth of the saturation quantity of $As_2O_3$ and one-eighth of the saturation quantity of thallium fluoride, and respective saturation quantities. The thickness of the layers was determined in case 2 by estimation of the light transmission of the layers. While using the experimental layers according to 1, it was found that the additions to the etchant do not detrimentally influence the etching rate.

The following variations of the etching rates could be found for etchants which contained the saturation quantity $As_2O_3$ and $As_2O_3$ and TlF, respectively.

| Material | $NH_4F + HF$ | $NH_4F + HF + As_2O_3$ | $NF_4F + HF + As_2O_3 + TlF$ |
|---|---|---|---|
| Fe | 800A/150 sec. | 200 A/20 min. | 200 A/20 min. |
| FeSi | 600A/70 sec. | 200 A/20 min. | 200 A/20 min. |
| Ni | 200A/20 min. | 0 | 0 |
| CoNi | 500A/20 min. | 0 | 0 |
| Al | 800A/45 sec. | 800 A/80 sec. | 0 |

Additions of $As_2O_3$ of less than 40 mgs (quantity of saturation at room temperature) already reduce the rate by which the non-selected materials are etched, for example, 5 mgs of $As_2O_3$ reduce the etching rate for FeSi by 20 percent. As regards iron this quantity is already sufficient to bring about passivation. The optimum etching conditions particularly for FeSi are, however, obtained by adding the entire saturation quantity of $As_2O_3$ to the etchant.

The addition of TlF does not bring about a variation of the rate by which the said magnetic materials are etched, but it avoids the attack of aluminium layers. When the saturation quantity of 4.634 g/100 mls is added to the buffered etchant, a rapid attack of the aluminium must be expected. This attack is, however, discontinued after approximately 500 A of etching depth due to the formation of a thin passivation layer. In some cases it is possible to limit the TlF addition to 10 to 20 percent of the quantity of saturation.

What is claimed is:

1. An etchant for the selective etching of patterns in silicon dioxide layers comprising 40 grams of ammonium fluoride, 10 mls of 40 percent hydrofluoric acid, 60 mls of water together with a compound selected from the group consisting of 4 to 40 mgs. of arsenous oxide and 400 to 1,000 mgs. of thallium fluoride and mixtures thereof per 100 mls of etchant.

2. A process of selectively etching thin layers of silicon dioxide comprising the treating of said silicon dioxide with the etching composition of claim 1.

* * * * *